United States Patent [19]

Spa

[11] Patent Number: 4,630,645

[45] Date of Patent: Dec. 23, 1986

[54] PNEUMATIC SWITCHING DEVICE, E.G., FOR SAFEGUARDING AGAINST OVERPRESSURE

[75] Inventor: Lambertus K. J. Spa, The Hague, Netherlands

[73] Assignee: Beta B.V., The Hague, Netherlands

[21] Appl. No.: 724,798

[22] Filed: Apr. 19, 1985

Related U.S. Application Data

[63] Continuation of Ser. No. 414,050, Sep. 2, 1982, abandoned.

[30] Foreign Application Priority Data

Mar. 17, 1982 [NL] Netherlands ............ 8201105

[51] Int. Cl.[4] ............................................ F15B 13/042
[52] U.S. Cl. .............................. 137/625.6; 137/625.66
[58] Field of Search ............ 137/625.6, 625.64, 625.66

[56] References Cited

U.S. PATENT DOCUMENTS

| | | | |
|---|---|---|---|
| 3,670,771 | 6/1972 | Dewberry | 137/625.6 |
| 3,776,277 | 12/1973 | Nagashima | 137/625.6 |
| 3,797,525 | 3/1974 | Lieser | 137/625.6 |
| 3,805,837 | 4/1974 | Stampfli | 137/625.6 |
| 3,807,448 | 4/1974 | Hadden | 137/625.6 X |
| 4,066,101 | 1/1978 | De Fries | 137/625.6 |
| 4,150,687 | 4/1979 | Blanton | 137/625.6 X |
| 4,237,931 | 12/1980 | Rafaely | 137/625.66 X |

Primary Examiner—Gerald A. Michalsky
Attorney, Agent, or Firm—Charles H. Lindrooth

[57] ABSTRACT

Pneumatic switching devices do not constitute a danger in explosive surroundings contrary to electrical switching devices with which sparking may occur. Known pneumatic devices have the disadvantage of a long actuation path, whereby they can arrive at a so-called "cutting" position. Moreover, they are not suitable for actuation by the very sensitive pressure pick ups constituted by membrane pistons. Also the known pneumatic switching devices have large dimensions. The invention removes said disadvantages in that the switching device has a piston provided in a housing, a switching chamber and a pressure chamber being formed between the housing bore wall and a narrowed piston portion.

1 Claim, 3 Drawing Figures

PNEUMATIC SWITCHING DEVICE, E.G., FOR SAFEGUARDING AGAINST OVERPRESSURE

This is a continuation of co-pending application Ser. No. 414,050 filed Sept. 2, 1982, now abandoned.

The invention relates to a pneumatic switching device comprising a housing and an actuating pin connected to a valve, which in open position communicates a chamber within the housing with the ambient air.

In explosive surroundings e.g. on oil drilling platforms, electric switches may, due to spark generation, constitute a danger of explosions or fire respectively. Therefore it would be desirable to be able to use, e.g. in a safeguarding system against overpressure, a pneumatic switching device not constituting this danger.

There are known pneumatic switching devices, the actuating pin of which actuates against spring pressure a two way or three way slide valve but said devices have a long actuating path (2 to 3 mms) and also relatively large dimensions.

Pressure pick ups having a membrane piston, are often used as detector of a pressure and said membrane pistons are very sensitive so that they may have a stroke of only 0.02 to 0.03 mms. However, therewith they are unsuitable for the actuation of the known pneumatic switching devices. Moreover, said known pneumatic switching devices have the disadvantage that they may take a so called cutting position when they are actuated very slowly, i.e. take an intermediate position between the open and closed positions, so that the desired switching action does not occur.

The invention aims at removing the said disadvantages and at providing a pneumatic switching device, having small dimensions and an inambiguous actuation cycle.

This is achieved according to the invention in that a piston is received in a bore in the housing, said piston having a narrowed portion between two end surfaces, two seals being provided in said narrowed portion, which may cooperate with seats projecting from the housing bore wall towards the piston axis, a compression spring acting on the one end face of the piston, the other piston end face delimiting a pressure chamber with the housing, the air valve being in communication with the chamber, while a pilot air aperture having a restriction opens into said chamber, an outflow aperture opening between both housing seats and a signal pressure aperture opening into the bore beyond each seat.

Preferably a lever, which is pivotably connected to the switching device housing, engages with its free end, the end of the actuation pin of the air valve, a second actuation pin acting on said lever intermediate its ends a second pin being connected to the element to be watched. Thereby it is possible to bridge the difference which nevertheless the small stroke of the switching device according to the invention still exists relative to the stroke of a membrane piston, by means of the lever ratio. Moreover, thereby the movement of the pin of the air valve is accelerated relative to that of the pressure pick up pin, so that also with slow movement of that pin no intermediate position may occur, in which the air valve is half opened.

The invention will be illustrated below with reference to the drawing, which shows an embodiment, given as an example, of the switching device according to the invention.

Figure 1:
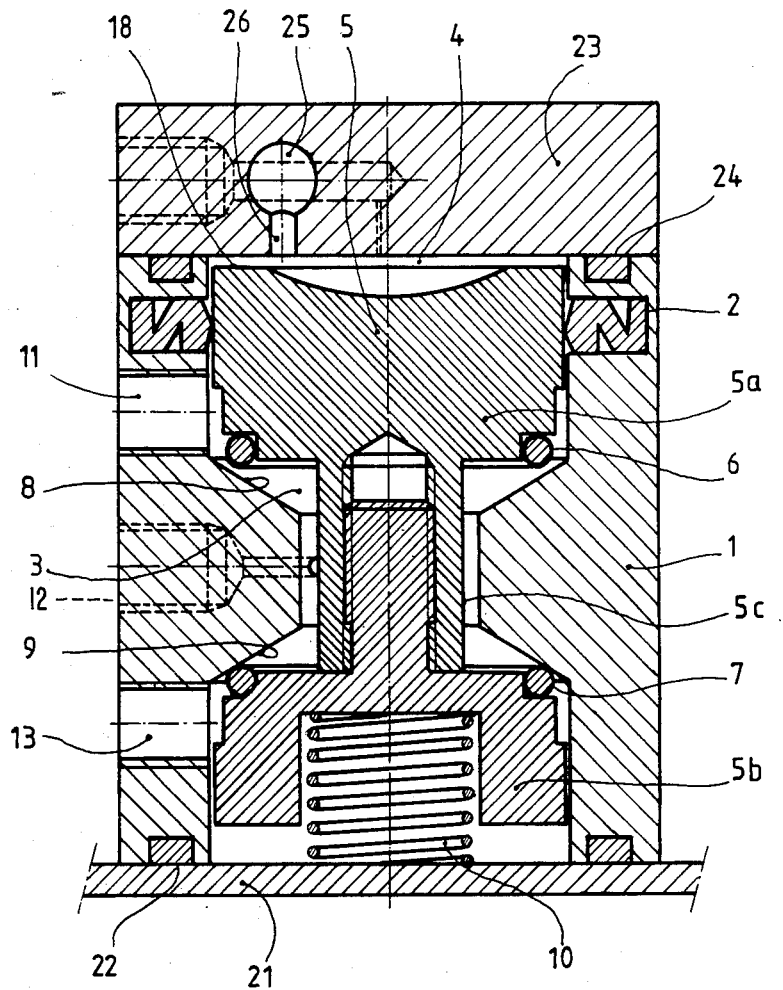
FIG. 1 shows a longitudinal section through the switching device.
Figure 2:
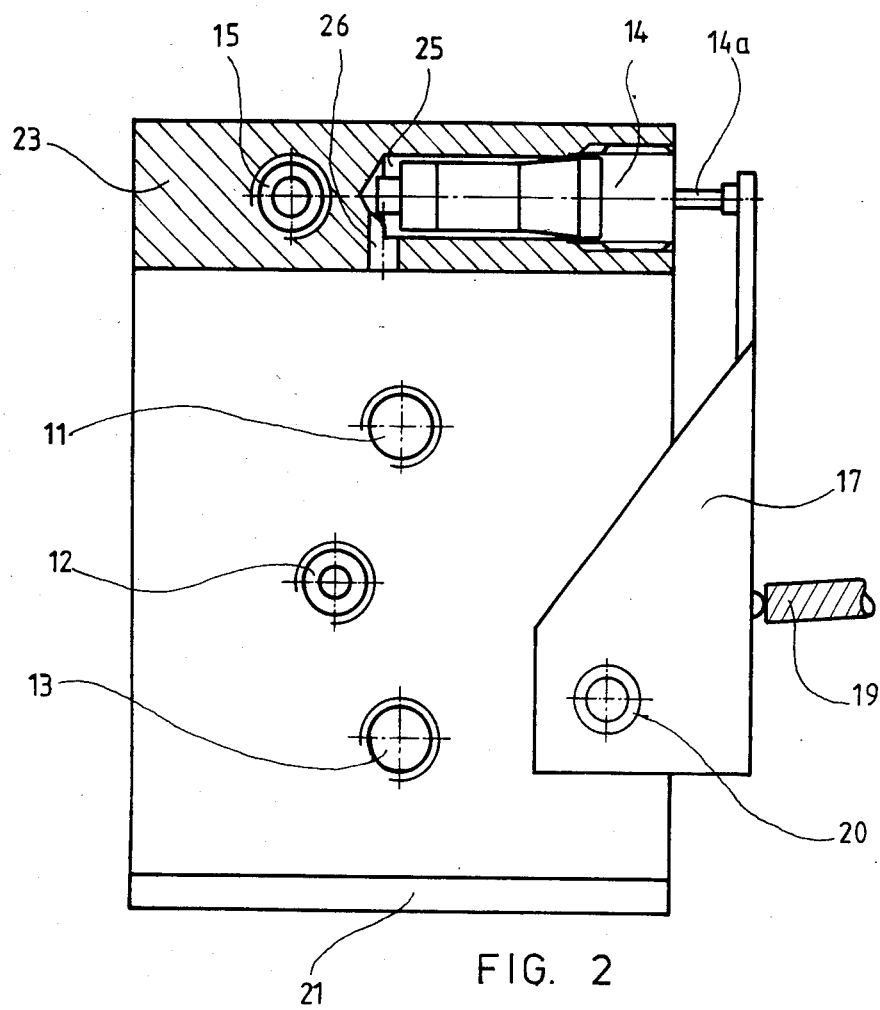
FIG. 2 is a side elevation, showing the air valve.

The pneumatic switching device shown has a housing 1, in which a piston 5 is received slidable in longitudinal direction. A seal 2 engages the circumference of said piston, which seal is received in a recess in the housing bore. Said seal is preferably a known seal, having a z-shaped cross-section, whereby a correct sealing is permitted with the least possible friction relative to the piston. The seal 2 divides the housing bore into a switching chamber 3 and a pressure chamber 4.

The piston 5 is constructed of two parts 5a and 5b, which may be screwed into each other and has a narrowed part substantially in the middle of its length, the walls delimiting said narrow part in the transverse direction each being provided at the periphery with a seal 6 and 7 respectively. The housing has a portion which projects inwardly relative to the remainder of the bore, whereby two oppositely positioned seats 8 and 9 have been formed, which project into the chamber 3 formed by the narrowed portion. The seals rings 6, 7 may cooperate alternatively with the seats 8, 9.

A compression spring 10 is received in the piston part 5b and engages a bottom plate 21 of the housing, while a sealing ring 22 performs the sealing between the bottom plate and the housing. The upper surface, as seen in the drawing, of the piston part 5a forms together with a cover 23 the pressure chamber 4, a sealing ring 24 providing for the sealing between the housing and the cover. Three connecting apertures or bores 11, 12, 13 are provided in the housing, the bore 11 being situated between the seals 2 and 6, the bore 12 between the seats 8 and 9, and the bore 13 between the seals 7 and 22. As will appear below, the bore 12 serves as an outflow opening and the bores 11 and 13 serve for the communication with a signal pressure.

Figure 3:
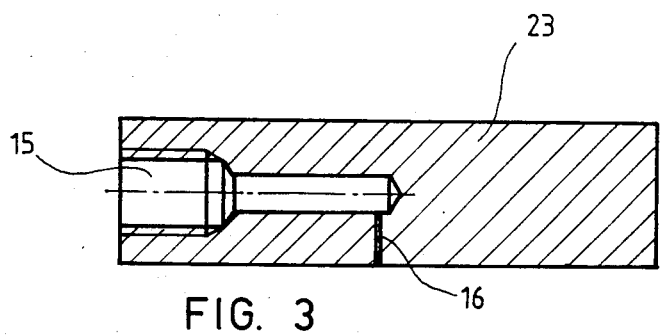
FIG. 3 is a longitudinal section through the pilot conduit having a restriction.

A bore 25 has been provided in the cover 23 and communicates the pressure chamber 4 through a conduit 26 in the cover with the ambient air, an air valve 14 being provided in said conduit, which has an actuating pin 14a projecting beyond the cover 23. Futhermore the cover 23 has a connecting bore 15, which is connected to the pressure chamber 4 through a restriction 16 as appears from FIG. 3.

The switching device as described operates as follows. If a pilot pressure is connected to the pilot pressure bore 15, said pilot pressure being constant, e.g. 1.5 bar, and if the air valve 14 is closed, a pressure will build up in the pressure chamber 4. Said pressure acts on the piston surface 18, whereby a downward force is imparted to the piston 5. When said force overcomes the force of the oppositely situated spring 10 the piston moves against the spring pressure and the seal 6 is positioned in engagement with the seat 8.

If a signal air pressure is connected to the bore 11, said pressure remains restricted to the space between the piston 5, the bore wall of the housing and both seals 2 and 6.

If the switching device serves for safeguarding against pressure, an element which is under the influence of this pressure to be controlled, is connected to the actuating valve pin 14a of the air valve 14. Preferably, as will be elucidated below, this element will be connected with a second actuating pin 19 engaging a lever 17, which is pivoted to the housing 1 at its one end at 20. The free end of the lever 17 engages the end of the pin 14a of the air valve 14. If the controlled pressure increases over the admissable value, now the valve 14 is opened, whereby a leak is produced in the pressure chamber 4. The restriction 16 in the pilot pressure connection 15 ensures that the leak through the air valve is larger than the supply through the bore 15, so that the pressure in the chamber 4 decreases. At a predetermined moment the spring 10 overcomes the pressure exerted to the piston from the other side, whereby the piston moves in the direction of the imparted spring pressure and the seal 6 releases the seat while the seal 7 becomes engaged with the seat 9. Now the signal air from the bore 11 may pass through to the switching chamber 3 and from there via the bore 12 outwardly whereby an output signal is obtained. This bore may be connected with an actuating means for e.g. a venting valve, which exhausts the controlled pressure whereby its value decreases. When this pressure again reaches its permissable value, the valve 14 closes and thereafter the piston again moves downwardly, whereby the starting situation is again obtained. Surpressure, remaining in the switching chamber 3, if any, can now vent through the bore 13. It is also possible to connect the signal air to the bore 13. If now the air valve 14 is in its inactuated situation, to signal air may pass through from the bore 13 through the chamber 3 to the bore 12, whereby a continuous signal is obtained in the inactuated condition. When the valve 14 is actuated the air signal is closed and the pressure in the switching chamber 3 may vent via the aperture 11. Thereby the switching device is used for a normally open situation contrary to the normally closed situation as described above.

If a pressure is controlled by an element connected to the actuating pin 19, which moves through a very short actuation path, e.g. 0.02 to 0.05 mms, the possibility exists that if this pin would act directly on the air valve 14 and the actuation would take place very slowly, the leak through the valve 14 would be temporarily equal to the supply through the restriction 16. This could result in a moment in which the piston does not know which position it must take. In order to prevent from the start that this situation arises the lever 17 has been provided, whereby the movement of the pin 19 is transmitted to the pin 14a in an enlarged ratio. Also with small shifting of the pin 19 then the valve 14 always opens with a cross-section which is larger than the cross-section of the restriction 16. This ensures a quick operation of the switching device, also with a small actuation path of the pin 19.

However, if the pin 19 itself is constructed with a large actuation path then the lever 17 is superfluous.

What is claimed is:

1. A pneumatic switching device comprising a housing having a bore, a piston mounted for axial movement within said bore between first and second spaced-apart positions, said piston having a narrowed portion intermediate its ends, the piston having axially spaced-apart sealing means in the narrowed portion, said bore having a pair of seats cooperating with said axially spaced-apart sealing means to provide a seal with one of said seats upon movement of the piston to a first of said spaced-apart positions and with the other of said seats upon movement of the piston to the second of said spaced-apart positions, said housing having an outlet aperture in communication with the bore intermediate said seats and a pair of signal pressure apertures spaced axially of the bore on opposite sides of said outlet aperture, and axially outboard of said pair of seats, the piston and the bore being configured to open one of said signal pressure apertures for communication with the outlet aperture and to close the other signal pressure aperture when the piston is in said first position and to close the opened signal pressure aperture and open the closed signal pressure aperture when the piston is in said second position, means biasing the piston to the first of said spaced-apart positions, a chamber at the end of the bore towards which the piston is biased, a pilot passage independent of said apertures for admitting a gas under pressure to said chamber, a vent passage for venting said chamber, a vent valve in said vent passage, said vent passage having a cross-sectional area which is large in relation to the cross-sectional area of said pilot passage, a vent valve actuating means operable to close said vent valve to effect movement of the piston to the second of said spaced-apart positions under influence of said pilot pressure in response to one pressure condition and to open said valve in response to another pressure condition to allow movement of the piston to the first of said positions under influence of said biasing means, and means including said piston for isolating said apertures from said chamber, said vent valve actuating means comprising a lever, a pivotal connection for pivotally connecting the lever to the housing, said vent valve having an actuating pin projecting from the housing and being movable to open said vent valve, the lever being in engagement with the actuating pin at a point on the lever remote from the pivotal connection, a second actuating pin engageable with said lever at a point intermediate the pivotal connection and point of engagement with the actuating pin, movement of said second actuating pin causing pivotal motion of said lever and movement of said first-named actuating pin to open said vent valve.

* * * * *